United States Patent [19]
Adelson et al.

[11] Patent Number: 4,622,639
[45] Date of Patent: Nov. 11, 1986

[54] AIRCRAFT CENTER OF GRAVITY AND FUEL LEVEL ADVISORY SYSTEM

[75] Inventors: Richard L. Adelson, Augusta; Franklin D. Nusbaum, Jr., Wichita, both of Kans.

[73] Assignee: The Boeing Company, Seattle, Wash.

[21] Appl. No.: 562,206

[22] Filed: Dec. 16, 1983

[51] Int. Cl.⁴ .............................................. G01M 1/12
[52] U.S. Cl. .................................. 364/463; 364/567; 73/65
[58] Field of Search .............. 364/463, 466, 567, 442; 340/945, 666; 235/61 T; 73/65; 177/25

[56] References Cited
U.S. PATENT DOCUMENTS

| | | | |
|---|---|---|---|
| 3,042,060 | 7/1962 | Lindemann | 73/65 |
| 3,584,503 | 6/1971 | Senour | 364/463 |
| 3,746,844 | 7/1973 | Azum et al. | 364/463 |
| 4,034,334 | 7/1977 | Allyn | 340/945 |
| 4,110,605 | 8/1978 | Miller | 364/463 |
| 4,225,926 | 9/1980 | Wendt | 364/463 |
| 4,463,428 | 7/1984 | Gilliam | 364/463 |
| 4,502,555 | 3/1985 | Gower | 364/463 |

Primary Examiner—Gary Chin
Attorney, Agent, or Firm—Edwin H. Crabtree

[57] ABSTRACT

An aircraft center of gravity and fuel level advisory system connected to the aircraft's fuel tank gauges and operated by an aircraft personnel. The system provides the aircraft's personnel with real time display of the aircraft's center of gravity and a signal when forward and aft center of gravity limits are approached. The system provides a means for a crew member to select a fuel level for a tank or set of tanks and when the actual fuel level approaches the selected value, the system will alert the crew member.

11 Claims, 9 Drawing Figures

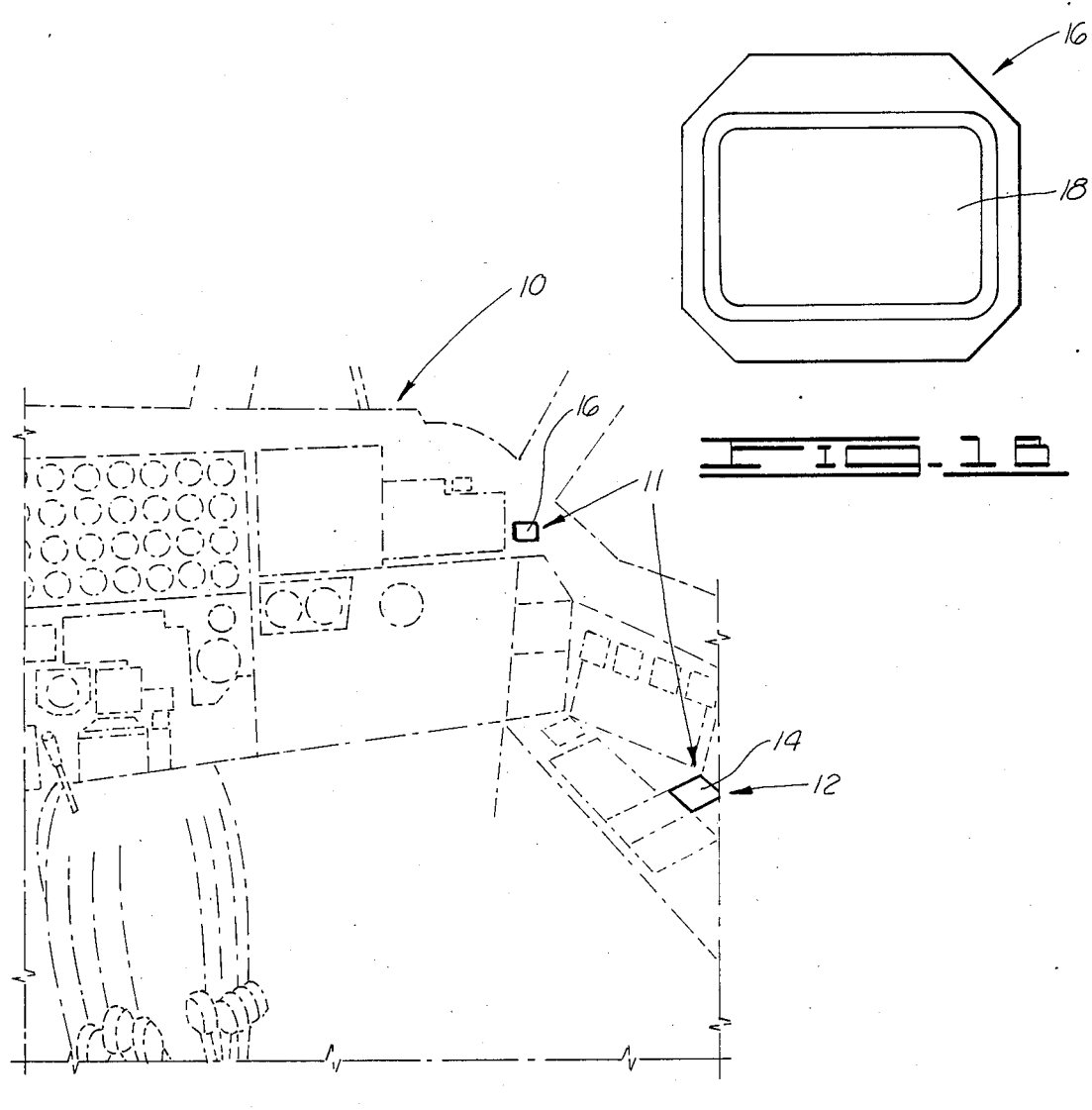
FIG-1B
FIG-1
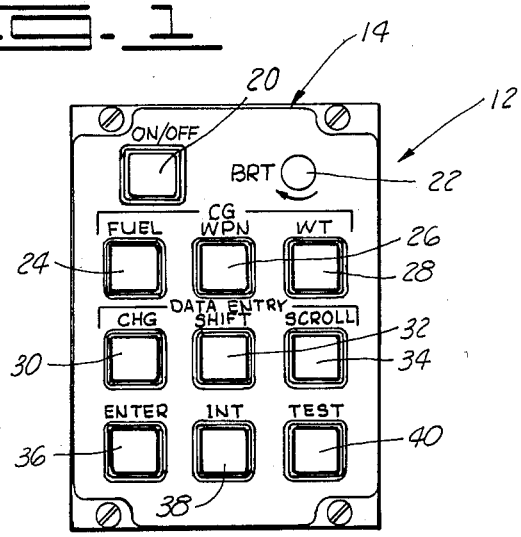
FIG-1A

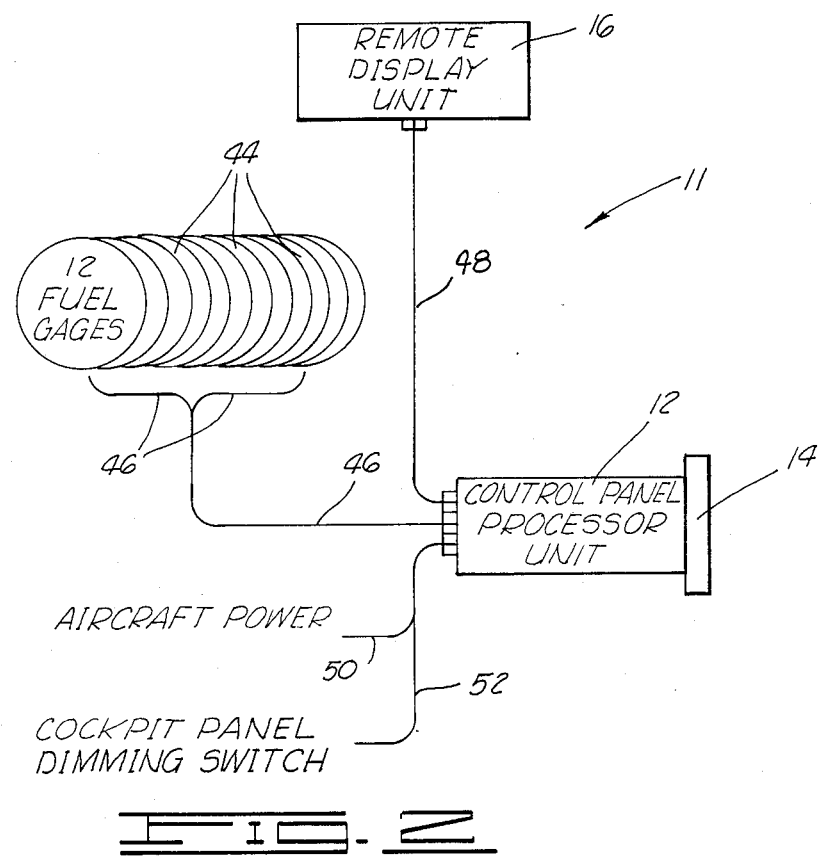
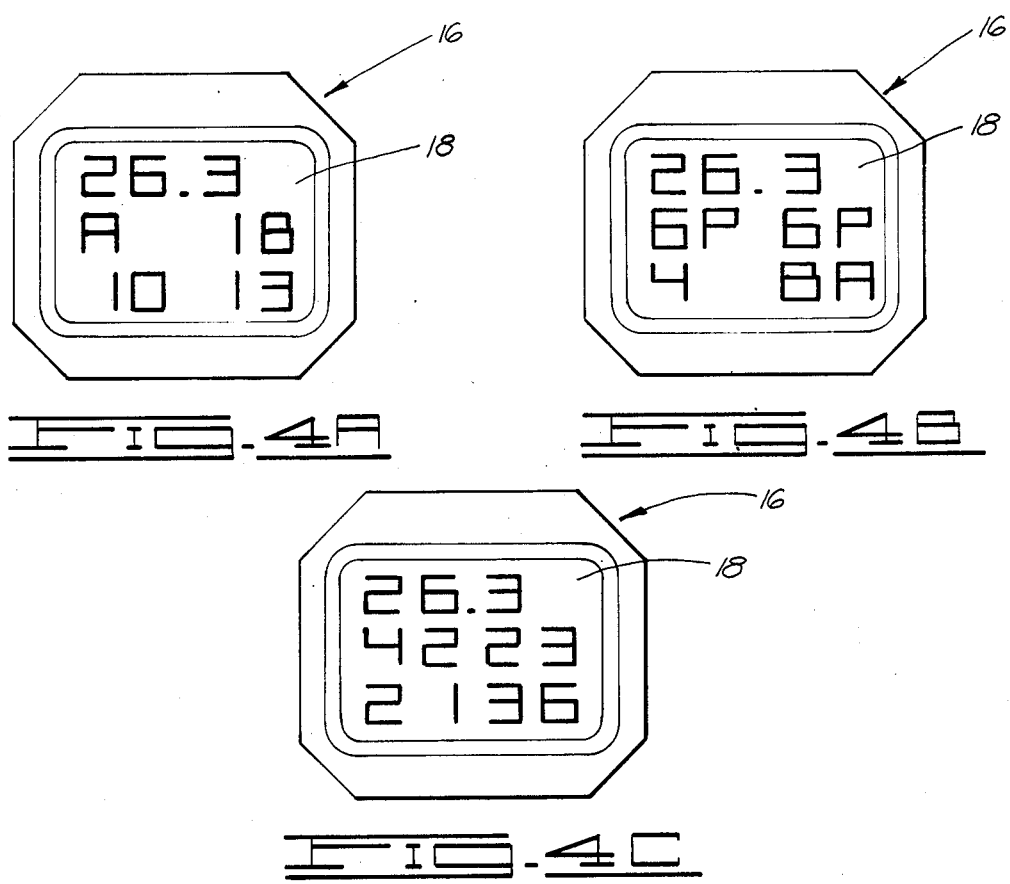

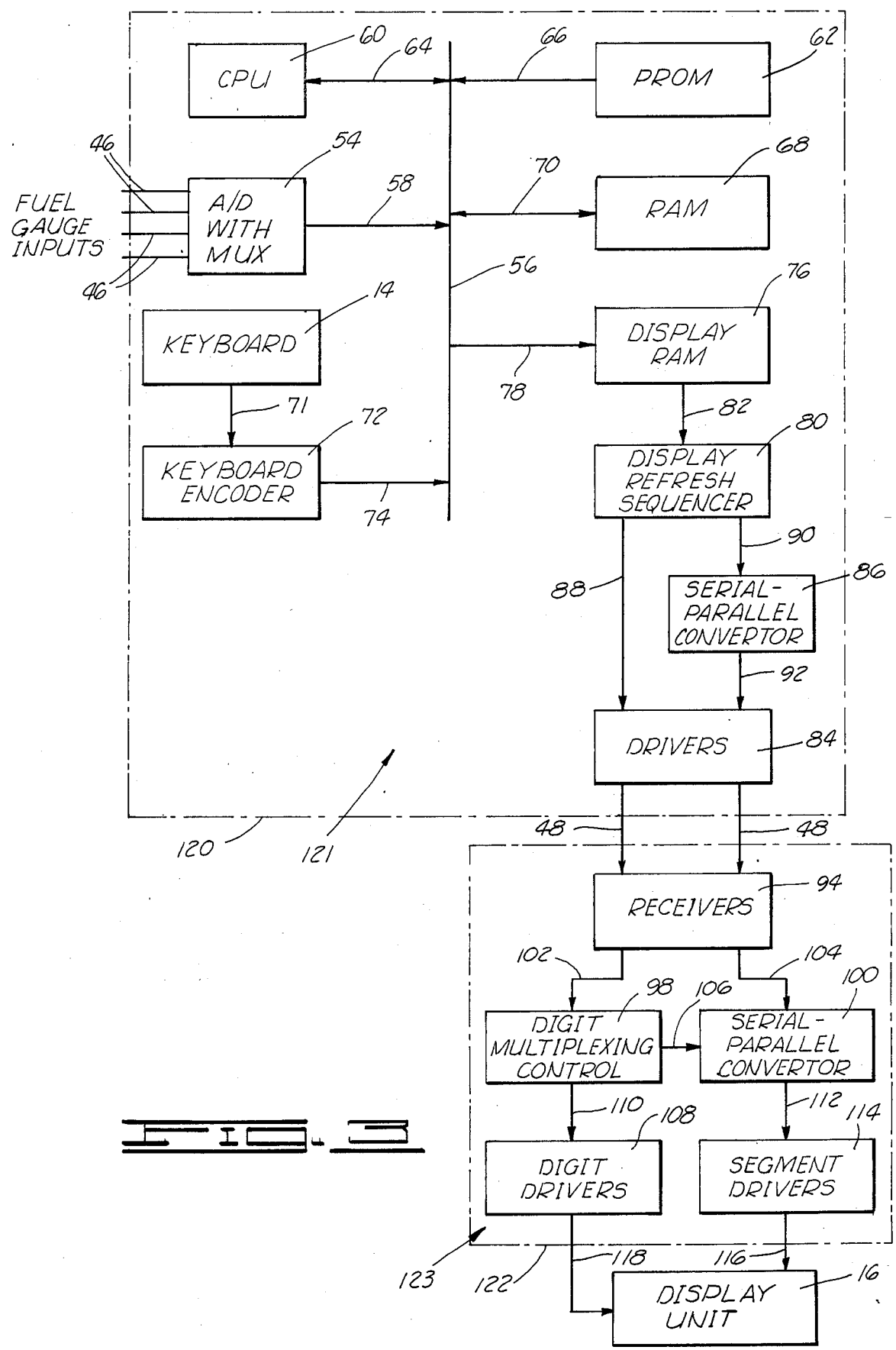

AIRCRAFT CENTER OF GRAVITY AND FUEL LEVEL ADVISORY SYSTEM

BACKGROUND OF THE INVENTION

This invention relates to an aircraft's center of gravity and fuel level advisory system and more particularly, but not by way of limitation, to an advisory system for a military aircraft having a plurality of fuel tanks with external and internal expendable loads such as different types of launch missiles, bombs and other types of weaponry.

Heretofore, a military aircraft such as the B-52 was originally designed for minimum center of gravity travel as weapons were released from the bomb bay. Later when external weapons carriage capability was added to this aircraft special fuel management procedures were required to keep the aircraft within center of gravity limits. The aircraft's center of gravity travels aft as external weapons are released.

Currently, different types of cruise missiles are being externally mounted on the B-52 aircraft. The forward placement of these heavy missiles has made weight and balance control and fuel management procedures a major concern to the military. Pilots and co-pilots of this aircraft need to know the aircraft's center of gravity and how many external weapons can be released without exceeding the aircraft's aft center of gravity limit. Currently, this task is accomplished by using a slide rule called a load adjuster to compute aircraft center of gravity and curves to determine how many external weapons may be safely released. This type of procedure is time consuming, cumbersome and subject to error.

In the following United States patents, U.S. Pat. No. 2,751,921 to Baldwin et al, U.S. Pat. No. 2,948,146 to Bergeson, U.S. Pat. No. 2,987,254 to Kolisch, U.S. Pat. No. 3,042,060 to Lindemann, U.S. Pat. No. 3,415,979 to Bussell et al, U.S. Pat. No. 3,486,017 to Arseneau, U.S. Pat. No. 3,626,752 to Levins and U.S. Pat. No. 4,110,605 to Miller various types of load analysis systems have been used with different types of aircraft for providing the flight crew with continuous information as to the center of gravity of the aircraft. None of these prior patents specifically provide the unique advantages of having an on-board computer processor unit with remote display for alerting the pilots of the aircraft when center of gravity limits are being approached as external and internal loads such as different types of weapons are released from the aircraft and the center of gravity is changed.

SUMMARY OF THE INVENTION

The subject center of gravity and fuel level advisory system displays in real time the aircraft's center of gravity as fuel is burned, transferred between fuel tanks and during air refuel operation. Also, the system alerts the aircraft personnel when center of gravity limits are being approached and when a lateral unbalance exists relative to the aircraft wing tanks.

Further, the system displays the number of external weapons that may be released and not exceed the aft center of gravity limit.

Also, the system provides for a cueing system that advises the pilot that a fuel management sequence step has been completed.

The system includes a weapon status display relative to the number and location of weapons on board the aircraft. The display provides a means for the aircraft personnel to update weapon status as weapons are expended. The resulting shift in the aircraft's center of gravity and weight is adjusted by the ob-board computer and reflected in the aircraft real time center of gravity display.

The advisory system also includes a display containing real time center of gravity, gross weight and total fuel along with look-ahead capabilities relative to weapon release, fuel burned and or transfer of fuel to enable the pilot to project center of gravity travel. The system has a fuel gauge signal override capability which allows the operator to manually input fuel values for the different gauges.

The system reduces crew workload without disturbing existing aircraft systems and enhances the overall safety of the aircraft personnel and the aircraft.

While the system is used for military aircraft, it can be used equally well on commercial aircraft, aircraft refueling tankers, cargo planes and other aircraft applications.

The aircraft's center of gravity and fuel advisory system which is connected to the aircraft's fuel gauges and operated by one of the aircraft's personnel includes a control panel processor connected to the aircraft's power source and fuel gauges. The processor unit includes a computer and necessary memory for storing and calculating aircraft weight and center of gravity, fuel consumption, internal and external load weights and the like. A keyboard is mounted on the processor unit and connected thereto. The keyboard includes a power on/off switch, fuel level switch, load switch, weight switch and necessary data entry keys so that the aircraft personnel can continually update information to the control panel processor and the display unit. A remote display unit is connected to the processor unit for displaying the aircraft's center of gravity when the fuel level switch is activated. The center of gravity display is designed to alert the aircraft personnel when a load is released from the aircraft and the center of gravity limit is being approached. When the load switch is activated the display unit displays the number of external and internal loads and their location on the aircraft. When the weight switch is activated, the display unit displays the aircrafts gross weight and total fuel weight.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates a portion of a B-52 aircraft instrument panel with FIGS. 1A and 1B illustrating a control panel processor unit and a remote display unit which may be mounted in the instrument panel of the aircraft.

FIG. 2 illustrates a diagram of the center of gravity and fuel level advisory system.

FIG. 3 illustrates a block diagram of computer and electronic hardware connected to the fuel gauges and remote display unit.

FIGS. 4A, 4B and 4C illustrate typical displays of the remote display unit when the fuel, load and weight switches are activated.

DETAILED DESCRIPTION OF THE DRAWINGS

Figure 3A:
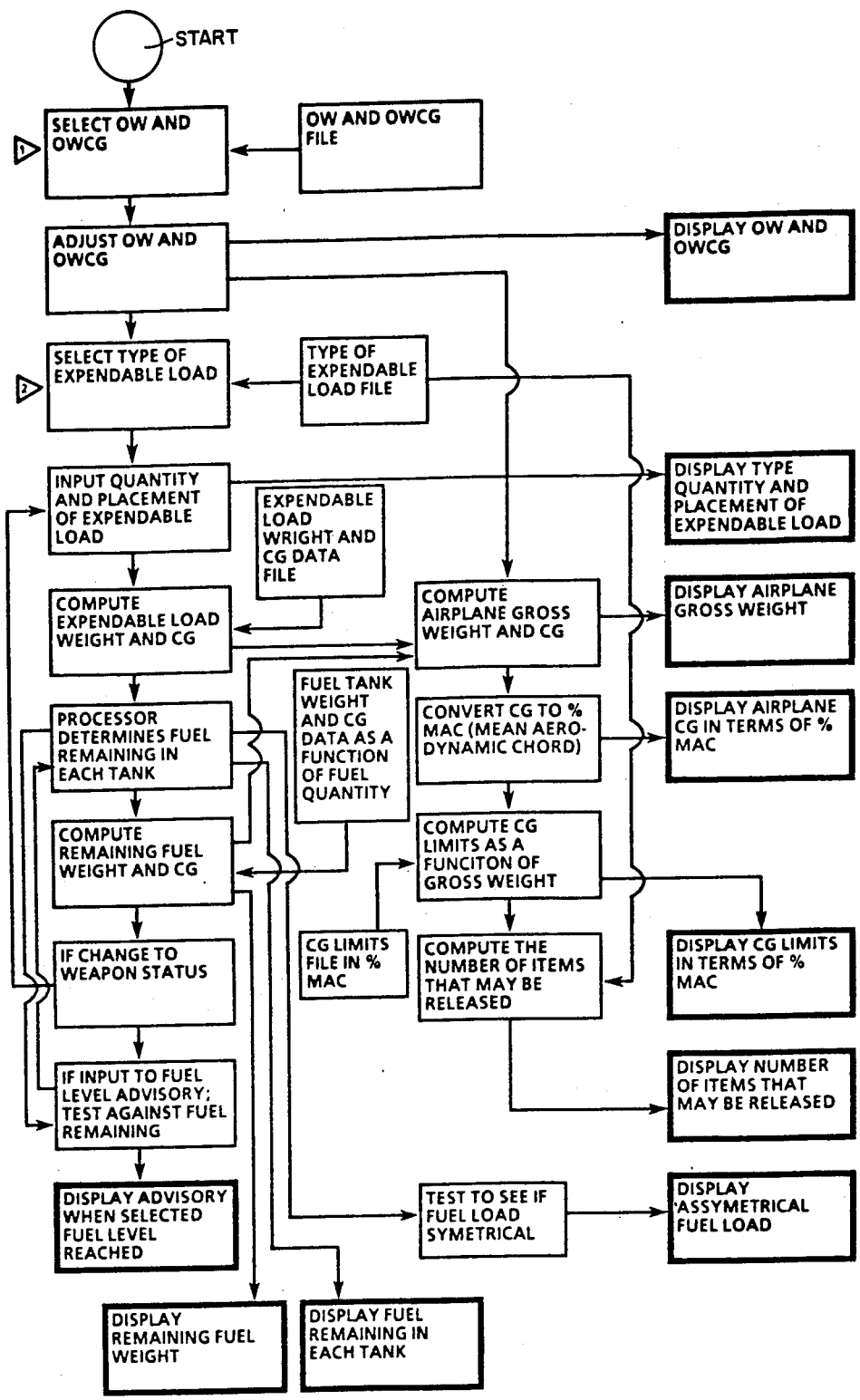
FIG. 3A illustrates a computation flow chart used with the subject advisory system.

In FIG. 1 a typical instrument panel 10 of a B-52 military aircraft is illustrated showing where the center of gravity and fuel level advisory system designated by reference numeral 11 with a control panel processor unit 12 and keyboard 14 is located. The unit 12 and keyboard 14 are shown in greater detail in FIG. 1A. Also shown in FIG. 1B is a remote display unit 16. FIG. 1 shows the unit 16 can be mounted in the instrument panel 10.

The display unit 16 includes a display 18 for viewing by an aircraft personnel such as the aircraft's co-pilot, or if necessary, the aircraft's pilot. The keyboard 14 connected to the control processor unit 12 includes a power on/off switch 20. The display unit 16 and its brightness is controlled by a brightness control knob 22 on the keyboard 14.

The keyboard also includes a fuel level switch 24, load or weapon switch 26 and weight switch 28. Data entry keys on the keyboard 14 include a change key 30, shift key 32, scroll key 34, enter key 36, INT key 38 and test key 40. The keyboard 14 with center of gravity switches and data entry keys will be discussed further in detail when describing the operation of the system 11.

In FIG. 2 the center of gravity and fuel level advisory system 11 is shown with the remote display unit 16, control panel processor unit 12 and keyboard 14 and the necessary leads connecting the processor unit 12 to a plurality of fuel gauges 44 via leads 46. The display unit 16 is connected to the processor unit via lead 48. Power is supplied to the processor unit 12 via lead 50 connected to the aircraft's power system. Also, the processor unit is connected to a cockpit panel dimming switch via lead 52.

In FIG. 3 a block diagram of the necessary computer hardware and electronics of the processor unit 12 and display unit 16 are shown connected to the fuel gauges 44 and display unit 16.

The processor unit 12, in part, includes an analog to digital converter with multiplexer 54 connected to leads 46 which are attached to the fuel gauges 44. The multiplexer 54 is connected to a common data bus 56 via lead 58. The processor 12 also includes a central processor unit 60 and a PROM 62 connected to the bus 56 leads 64 and 66. The PROM is pre-programmed with constants such as fuel moment tables, payload weight and constants, aircraft weight, CG envelopes and other necessary tables and the like. A RAM 68 is connected to the bus 56 via lead 70 and is used for storing and inputting additional fuel gauge information and payload update information inputted by the aircraft personnel. The keyboard 14 is connected via lead 71 to a keyboard encoder 72 which is attached to the bus 56 via lead 74. The common data bus 56 is connected to a display RAM 76 via lead 78. The display RAM 76 is connected to a display refresh sequencer 80 via lead 82. The sequencer 80 is connected to drivers 84 and a serial parallel converter 86 via leads 88 and 90. The serial parallel converter is connected to the drivers 84 via lead 92.

The drivers 84 on a board 121 of the processor unit 12 are connected to receivers 94 on a board 123 of the display unit 16 via leads 48. The receivers 94 are connected to a digit multiplexing control 98 and a serial parallel converter 100 via leads 102 and 104. The digital multiplexing control 98 is connected to the converter 100 via lead 106. The multiplexing control 98 is connected to a digit driver 108 via lead 110. The serial parallel converter is connected to segment drivers 114 via lead 112. The segment drivers 114 and digit drivers 108 are connected to the remote display unit 16 via leads 116 and 118.

Dotted lines 120 frame the control panel processor unit board 121 and dotted lines 122 frame the display unit board 123. The display unit board 121 and control panel processor unit board 123 make up the hardware and firmware for the control panel processor unit 12 and remote display unit 16.

In FIG. 3A a computation flow chart is shown which is programmed into memory in the processor unit 12 for analyzing operating weight, operating weight center of gravity, and expendable load such as the release of bombs, missiles, pylons, etc. The flow chart is based on well-known center of gravity and fuel level formulas such as found in U.S. Air Force Technical Manual (T.O. 1-1B-50), Basic Technical Order for USAF Aircraft, Weight and Balance, FAA's Weight and Balance Handbook and Air Force Manual (T.O.1-1B-40) Weight and Balance Data. The various displays shown in FIG. 3A would appear on the remote display unit 16 connected to the processor unit 12.

In FIGS. 4A, 4B and 4C the remote display unit 16 provides three display formats, they are fuel level, load or weapon status and aircraft weight. Each format has a dedicated switch on the keyboard 14 of the control panel processor unit 12.

The fuel level format is displayed when the fuel switch 24 is activated. The format contains the aircraft's current center of gravity displayed in FIG. 4A as 26.3. The aircraft's center of gravity is measured in percent of means aerodynamic chord (MAC). In this case 26.3 percent MAC. This figure automatically changes as fuel is burned and transferred and when external and internal payload updates are inputed by the operator. Further the center of gravity display flashes if a center of gravity limit is being approached. Below the aircraft center of gravity, a selected code for one or a combination of the aircraft's tanks and its selected burn to fuel level is displayed, for example aft body 18,000 lbs.

The next display below the aft body 18,000 lbs. is number 10 which illustrates the remaining external load items or missiles that may be released and not exceed the center of gravity limit. To the far right of the number of remaining missiles is a cue which is a differential number between the actual fuel level of the tank to a preselected burn down to level. The cue appears when the actual fuel level approaches the selected burn down to level. In this case, the actual value is within 3,000 lbs. of the selected burn down to level. When this number changes to a difference of zero the display flashes.

Between the 10 and 3, as shown in FIG. 4A, is a field to display an asymmetrical fuel load condition that may develop. For example, if the number 1 main wing tank is significantly lower than the number 4, its opposite wing tank, the number 1 appears between the 10 and 3 as shown in the drawing.

When the load or weapon switch 26 is activated and shown in FIG. 4B, the weapon format display on the middle line is shown illustrating the location of external missiles. For example, six missiles on a left pylon and six missiles on a right pylon. On the lower line the display shows the number in the weapons bay load. In this case the number of weapons in the forward, center and aft compartments. Four bombs in forward, none in center and eight SRAM in aft end of the weapons bay. The Figure A indicates ammunition loaded. A zero would indicate ammo not loaded or expended.

In FIG. 4C the weight switch 28 has been activated and the figure under the center of gravity 26.3 percent shows an aircraft gross weight times 100 lbs., in this case a gross weight of 422,300 lbs. The lower line shows a total fuel weight times 100 lbs. or 213,600 lbs. This display may be changed to bring up the individual tank quantities by pressing the scroll key 34.

In operation, to activate the system 11, engage the on/off switch 20 to the on position and then adjust the display unit brightness as required using the brightness control knob "BRT" 22. Pressing the TEST key 40 will bring up a TEST PASS or a TEST FAIL display. To view or change data in memory, press the initialization "INT" key 38. The "change", "shift", "scrool" and "enter" keys 30, 32, 34 and 36 are used to enter, revise and up-date data.

Changes may be made in the construction and arrangement of the parts or elements of the embodiments as described herein without departing from the spirit or scope of the invention defined in the following claims.

What is claimed is:

1. An aircraft center of gravity and fuel level advisory system for fixed wing aircraft connected to the aircraft's fuel gauges and operated by one of the aircraft's personnel, the system comprising:
    a control panel processor unit connected to the aircraft's power source and fuel gauges, the processor unit including a computer and memory for storing and calculating aircraft weight, center of gravity, fuel consumption and transfer, the weight and center of gravity shift of internal and external payload items as they are expended during flight;
    a keyboard mounted on the processor unit and connected thereto, the keyboard having a power on/off switch and a fuel level switch; and
    a remote display unit connected to the processor unit, the display unit displaying the aircraft's center of gravity when the fuel level switch is activated, the center of gravity display designed to alert the aircraft personnel of the center of gravity change as the fuel load changes and when a load is released from the aircraft during flight and when a center of gravity limit is being approached.

2. The system as described in claim 1 wherein the display unit visually flashes for alerting the aircraft personnel when the center of gravity limit is being approached.

3. The system as described in claim 1 wherein the display unit further displays a number of external loads which can be released without exceeding the aircraft's center of gravity limit.

4. The system as described in claim 1 wherein the display unit further displays a wing tank which has a lower fuel quantity relative to its opposite wing tank.

5. The system as described in claim 1 wherein the display unit further displays a code for a certain aircraft fuel tank and it's fuel weight.

6. The system as described in claim 5 wherein the display unit further displays a fuel differential between the actual fuel level in the fuel tank and a selected burn down to fuel level.

7. An aircraft center of gravity and fuel level advisory system connected to the aircraft's for fixed wing aircraft fuel gauges and operated by one of the aircraft's personnel, the system comprising:
    a control panel processor unit connected to the aircraft's power source and fuel gauges, the processor unit including a computer and memory for storing and calculating aircraft weight, center of gravity, fuel consumption and transfer, the weight and center of gravity shift of internal and external payload items as they are expended;
    a keyboard mounted on the processor unit and connected thereto, the keyboard having a power on/off switch, a fuel level switch and a load switch; and
    a remote display unit connected to the processor unit, the display unit displaying the aircraft's center of gravity when the fuel level switch is activated, the center of gravity display designed to alert the aircraft personnel of the center of gravity change as the fuel load changes and when a load is released from the aircraft during flight and when a center of gravity limit is being approached, the display unit further displaying the number and placement of external loads and internal loads on the aircraft when the load switch is activated.

8. The system as described in claim 7 wherein the display unit indicates the number of the external loads that can be released without exceeding the center of gravity limit of the aircraft.

9. The system as described in claim 7 wherein the keyboard further includes a weight switch, the weight switch when activated displaying on the display unit the aircraft's gross weight, total weight of fuel and individual fuel tank weights.

10. An aircraft center of gravity and fuel level advisory system for fixed wing aircraft connected to the aircraft's fuel gauges and operated by one of the aircraft's personnel, the system comprising:
    a control panel processor unit connected to the aircraft's power source and fuel gauges, the processor unit including a computer and memory for storing and calculating aircraft weight, center of gravity, fuel consumption and transfer, the weight and center of gravity shift of internal and external payload items as they are expended;
    a keyboard mounted on the processor unit and connected thereto, the keyboard having a power on/off switch, a fuel level switch, a load switch and a weight switch; and
    a remote display unit connected to the processor, the display unit including:
        display of the aircraft's center of gravity when the fuel switch is activated, the center of gravity display designed to alert aircraft personnel of the center of gravity change as the fuel load changes and when a load is released from the aircraft during flight and visually flashes when a center of gravity limit is being approached;
        display of the number of external and internal loads which can be released without exceeding the aircraft's center of gravity limit when the fuel level switch is activated;
        display of a fuel tank code, fuel level and fuel differential between the actual fuel level and a selected burn down to fuel level when the fuel level switch is activated;
        display of a wing tank code with a non-symetrical fuel quantity relative to its opposite wing tank code when the fuel level switch is activated;
        display of the number and placement of external and internal loads on the aircraft and their location on the aircraft when the load switch is activated; and display of the gross weight of the aircraft, the total fuel weight of the aircraft and individual fuel tank weight when the weight switch is activated.

11. The system as described in claim 10 wherein the keyboard includes a plurality of data entry keys so that the aircraft personnel can continually update data to the control panel processor unit and remote display unit such as actual aircraft operating weight and operating weight center of gravity, external and internal load weight, load location, types of loads, change of load status, change in burn down to fuel level value.

* * * * *